US008046262B1

(12) United States Patent
Antony et al.

(10) Patent No.: US 8,046,262 B1
(45) Date of Patent: Oct. 25, 2011

(54) COORDINATING THE DELIVERY OF TWO OR MORE PACKAGES SHIPPED FROM DIFFERENT SOURCE LOCATIONS

(75) Inventors: Felix Antony, Issaquah, WA (US); Philipp K. Janert, Seattle, WA (US); Jonathan J. Shakes, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 1832 days.

(21) Appl. No.: 11/207,603

(22) Filed: Aug. 19, 2005

(51) Int. Cl.
*G06Q 30/00* (2006.01)
(52) U.S. Cl. ...................................... 705/26.1
(58) Field of Classification Search ............ 705/26, 705/27, 26.1, 330
See application file for complete search history.

(56) References Cited

U.S. PATENT DOCUMENTS

| 7,747,543 | B1 * | 6/2010 | Braumoeller et al. | 705/330 |
| 2002/0174038 | A1 | 11/2002 | Chien | |
| 2003/0004839 | A1 | 1/2003 | Lin et al. | |
| 2004/0068443 | A1 | 4/2004 | Hopson et al. | |
| 2004/0153379 | A1 * | 8/2004 | Joyce et al. | 705/28 |
| 2005/0171856 | A1 * | 8/2005 | Takahashi et al. | 705/26 |
| 2005/0177440 | A1 * | 8/2005 | Mathe et al. | 705/26 |
| 2006/0116893 | A1 * | 6/2006 | Carnes et al. | 705/1 |

FOREIGN PATENT DOCUMENTS

EP 0732278 A1 9/1996

OTHER PUBLICATIONS

Computers at Work; Traffic Management. Denver: Apr. 1982. vol. 21, Iss. 4; p. 37, 5 pgs http://proquest.umi.com/pqdweb?did=1337680&sid=2&Fmt=2&clientId=19649&RQT=309&VName=PQD.*
O'Reilly, Brian, "They've Got Mail! The Growth of Internet commerce has raised the stakes in the boxing match between UPS and FedEx.," Fortune, Feb. 7, 2003 (10 pages).
"Transportation Planning & Execution," Transportation Management, Manhattan Associates (2 pages) http://www.manh.com/tms/trans_plan_exec.html, [last accessed Sep. 7, 2004].
"Outbound Transportation," RedPrairie DLx Labor Management Logistics, Copyright 2003 RedPrairie Corporation (2 pages) http://www.redprairie.com/Solutions/outbound.htm, [last accessed Sep. 7, 2004].
Wei, Chue Chee, "High-Performance Cluster Computing—We do what we are best at and . . . ," Presentation, Dell Enterprise Systems Servers Storage (7 pages).
Cohen, Danny, "Electronic Commerce," ISI Research Report ISI/RR-89-244, Information Sciences Institute, Oct. 1989 (46 pages).

* cited by examiner

*Primary Examiner* — Mila Airapetian
(74) *Attorney, Agent, or Firm* — Robert C. Kowert; Meyertons, Hood, Kivlin, Kowert & Goetzel, P.C.

(57) ABSTRACT

A release schedule for an order having a single addressee address is described. The schedule specifies, for each of two or more shipments making up the order, each of the shipments having a different origin location, a release time at which the shipment is to be released from its origin location. The indicated release times are selected on the basis of typical carrier delivery durations from each of the origin locations to the addressee address, in order to cause all of the shipments of the order to be delivered to the addressee address at the same time. The release schedule may be used to schedule the release of the shipments of the order.

35 Claims, 6 Drawing Sheets shipping performance information table 400

| origin location | destination | carrier | class | condition(s) | typical delivery duration | volume of supporting detail |
|---|---|---|---|---|---|---|
| 1201 3d Ave Seattle WA 98101 | 131 S Dearborn St Chicago IL 60603 | ship-rite | 2d day | | 3.25 | 4 |
| 1201 3d Ave Seattle WA 98101 | 131 S Dearborn St Chicago IL 60603 | ship-rite | 2d day | under 12 pounds | 3.33 | 3 |
| 1201 3d Ave Seattle WA 98101 | 131 S Dearborn St Chicago IL 60603 | ship-rite | 2d day | not during holiday week | 2.67 | 3 |
| 1201 3d Ave Seattle WA 98101 | 131 S Dearborn St Chicago IL 60603 | ship-rite | 2d day | released Friday | 3. | 1 |
| 1201 3d Ave Seattle WA 98101 | 131 S Dearborn St Chicago IL 60603 | ship-rite | 2d day | (not during holiday week) and (not released Friday) | 2.5 | 2 |
| 1201 3d Ave Seattle WA 98101 | Chicago IL | ship-rite | 2d day | (not during holiday week) and (not released Friday) | 2. | 3 |
| 101 N Central Ave Pheonix AZ 85012 | 131 S Dearborn St Chicago IL 60603 | ship-rite | 2d day | | 4. | 2 |

FIG. 4 shipping performance detail information table 600

| origin location | destination | release time | arrival time | weight | carrier | class |
|---|---|---|---|---|---|---|
| 1201 3d Ave Seattle WA 98101 | 131 S Dearborn St Chicago IL 60603 | Mon 5/2/2005 4:15p | 5/4/2005 9:43a | 4.5 pounds | ship-rite | 2d day |
| 1201 3d Ave Seattle WA 98101 | 131 S Dearborn St Chicago IL 60603 | Tue 5/3/2005 4:25p | 5/6/2005 10:01a | 23 pounds | ship-rite | 2d day |
| 1201 3d Ave Seattle WA 98101 | 131 S Dearborn St Chicago IL 60603 | Fri 5/6/2005 2:25p | 5/10/2005 9:43a | 8 pounds | ship-rite | 2d day |
| 1201 3d Ave Seattle WA 98101 | 2 Prudential Plaza Chicago IL 60601 | Sat 5/7/2005 3:10p | 5/8/2005 8:14a | 3 pounds | ship-rite | 2d day |
| 101 N Central Ave Phoenix AZ 85012 | 131 S Dearborn St Chicago IL 60603 | Mon 5/9/2005 | Fri 5/13/2005 | 4 pounds | ship-rite | 2d day |
| 101 N Central Ave Phoenix AZ 85012 | 131 S Dearborn St Chicago IL 60603 | Wed 5/11/2005 | Mon 5/16/2005 | 4 pounds | ship-rite | 2d day |
| 1201 3d Ave Seattle WA 98101 | 131 S Dearborn St Chicago IL 60603 | Tue 12/20/2005 3:45p | 12/26/2005 9:32a | 9.5 pounds | ship-rite | 2d day |

FIG. 6

COORDINATING THE DELIVERY OF TWO OR MORE PACKAGES SHIPPED FROM DIFFERENT SOURCE LOCATIONS

TECHNICAL FIELD

The described technology is directed to the field of order fulfillment logistics.

BACKGROUND

While it is common for customers to purchase goods in person at a physical store and carry those goods home with them, the delivery of purchased goods is also quite common. Such delivery has long been performed in connection with the ordering of products from a paper catalog, and has been increasing driven by the advent and increasing market penetration of web merchants that make products available for selection and purchase via the World Wide Web ("the web"). Like other kinds of mail order merchants, many web merchants operate or otherwise use multiple distribution centers, from which products are shipped to customers, often using a third-party carrier to perform the delivery.

Such web merchants typically use a few conventional approaches to delivering products ordered by a customer. For an order containing a single item, the item is typically shipped in a single container from a distribution center having stock in the item to a delivery address specified by the customer, such as a delivery address at which the customer can receive packages, or a delivery address of a gift recipient to whom the order is a gift from the customer.

For an order containing multiple items all in stock at a single distribution center, these items are collected and sent from the distribution center to the delivery address specified for the order as a single shipment, made up of one or more containers. In these cases, the carrier typically charges the web merchant a single delivery fee for the shipment, sometimes even if the shipment is made up of several containers that are all going from the same origination point to the same destination of the same time. It can often be difficult and/or expensive for a web merchant that makes a wide variety of items available for purchase and permits customers to order any combination of items to ensure that all of a particular combination of items will be available from a single distribution center.

For an order containing multiple items not all in stock at a single distribution center, two alternative conventional approaches can be employed. As a first alternative, a set of two or more distribution centers is selected that collectively have stock in all of the ordered items. Each selected distribution center ships its subset of the ordered items to the order's delivery address as a separate shipment. When the first alternative is used, the carrier who delivers each shipment charges the web merchant a delivery fee for the shipment. The sum of these delivery fees is often larger than would be the single delivery fee for a single shipment from a single distribution center to the customer.

As a second alternative, an originating distribution center that has stock in at least one of the ordered items is selected. Any items not in stock at the originating distribution center are shipped to the originating distribution center from other distributions having stock. After all of these transferred items are received at the originating distribution center, a single shipment is sent from the originating distribution center to the delivery address. When the second alternative is used, the carrier who delivers each shipment charges the web merchant a delivery fee for the shipment. Again, the sum of these delivery fees is often larger than would be the single delivery fee for a single shipment from a single distribution center to the customer.

In view of the foregoing, an approach to efficient shipping items from two or more distribution centers to a customer would have significant utility.

BRIEF DESCRIPTION OF THE DRAWINGS

FIG. 4 is a table diagram showing sample contents of a shipping performance information table containing typical delivery durations for delivery scenarios.

FIG. 6 is a table diagram showing sample shipping performance detail information stored in a shipping performance detail information table.

DETAILED DESCRIPTION

Figure 1:
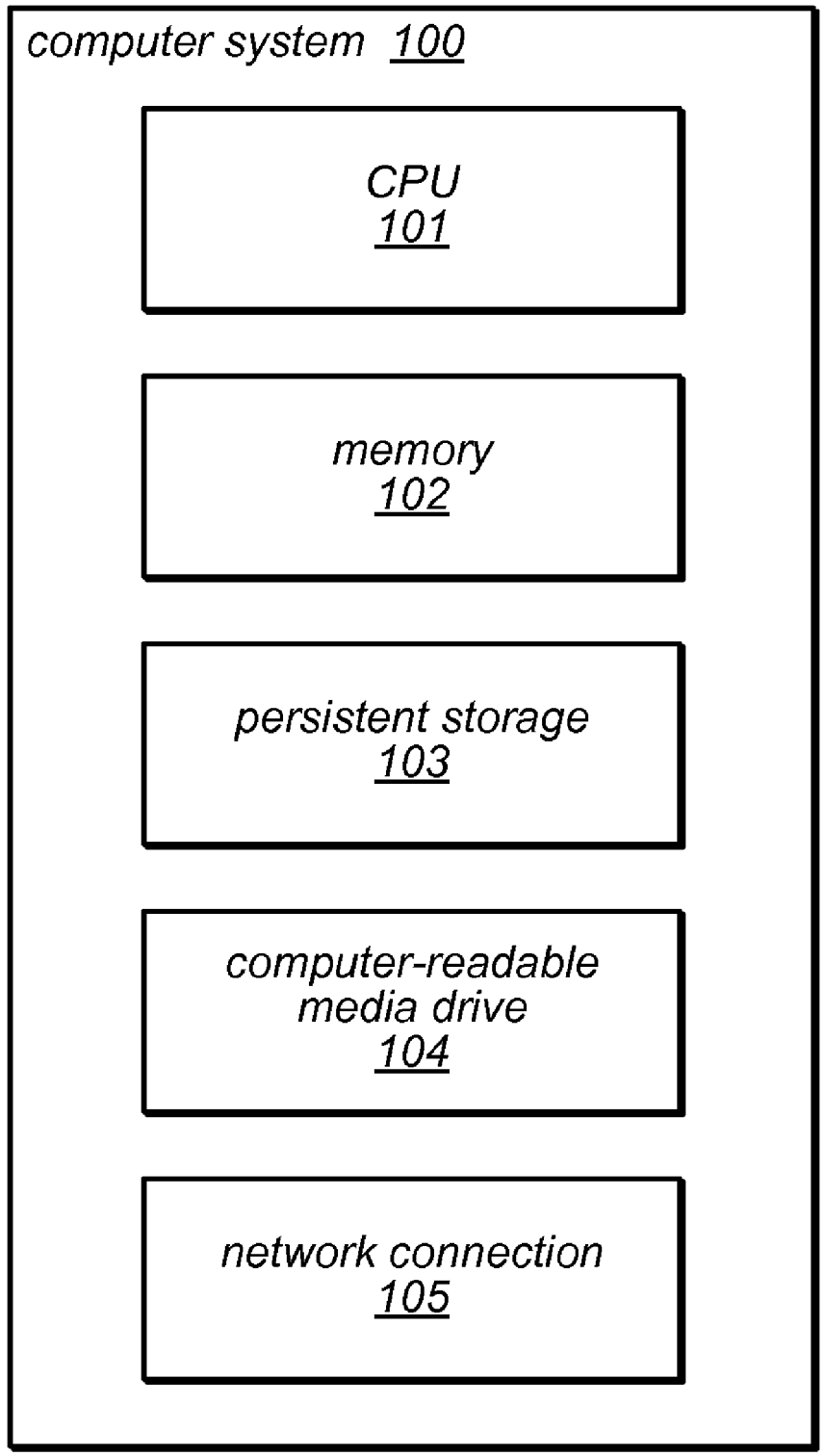
FIG. 1 is a block diagram showing some of the components typically incorporated in at least some of the computer systems and other devices on which the facility executes.

A software facility for coordinating the delivery of two or more packages each shipped from a different source location—such as different distribution centers of the same web merchant—to a common destination—such as the home of a customer of the web merchant ("the facility") is described.

In some embodiments, the facility collects or accesses performance information about the amount of time of one or more carriers take to deliver packages from various source locations to various destinations. When the web merchant identifies multiple distribution centers from which it will deliver different items among the items in a customer's order, the facility analyzes, for each of one or more available carriers, the amount of time to deliver each package from its originating distribution center to the destination specified by the customer for the order. The facility then chooses a set of coordinated release times at which each of the packages is to be released to the carrier from its corresponding distribution center, such that it is expected that all the packages will arrive at the destination at approximately the same time, such as on the same day.

Where the facility succeeds in causing all of the packages for an order to be delivered to the destination at approximately the same time, it can provide an emotional benefit to the recipient, who need not wonder about the identity of additional items included in the order, or when in the future they might arrive. For example, a customer that orders a battery-operated toy together with the batteries needed by the toy, then receives the toy without the ordered batteries may wonder whether he or she remembered to also order the batteries, and/or may wonder when the batteries will arrive and the toy can be used.

In some embodiments, the facility uses the same carrier for two or more of the packages constituting an order, potentially reducing the number of total visits that carriers will have to make to the destination in order to deliver all the packages. In some situations, by reducing the total number of visits to the destination, the facility may reduce the amount of effort expended by the recipient to receive the packages; e.g., the recipient may have to come to the door fewer times, sign fewer delivery confirmations, etc. Also, by reducing the total number of visits, the facility may reduce the amount of fuel and other consumables used in delivery vehicles, may reduce traffic levels and/or air pollution levels, etc. For some web merchants, the facility may also reduce the need to duplicate inventory across distribution centers, and correspondingly reduce the costs associated with doing so. Indeed, rather than having to insure a low probability of exhausting inventory and an item independently for each distribution center, such a web merchant may instead only need to insure a sufficiently low probability of simultaneously exhausting inventory in the item across all distribution centers.

In some cases, the operator of the facility or the web merchant may negotiate with one or more carriers a price structure for some or all destinations that results in a lower total delivery fee where the carrier is able to deliver multiple packages in the same visit to the destination. For example, where a particular carrier delivers packages to a particular destination from a particular staging point, the carrier may offer a discount to a web merchant that causes to packages from two distribution centers that are addressed to that destination to arrive at that staging point on the same day. Where such an arrangement is in place, the lower total delivery fee may contribute to a greater level of profitability for the web merchant, and/or a portion of the savings may be passed on to the customer. As an alternative to negotiating a price structure in which the price for delivering a particular order is sensitive to the web merchant's level of success in causing the packages of the order to arrive at the staging point on the same day, instead the price structure for future packages is adjusted to reflect the web merchant's statistical level of success in causing the packages of past orders to arrive at the staging point on the same day. This approach can be particularly useful where a carrier's billing system makes it difficult or impossible to adjust the price charged for a particular package or order based upon arrival time at the staging point. Carriers may be amenable to such negotiations in view of the fact that a significant portion of their cost for delivering a package is attributable to visiting the destination. This "last mile" portion of the cost can be particularly significant in residential areas, especially sparsely populated residential areas.

In some embodiments, the facility uses various scheduling algorithms to choose the set of coordinated release times. In some environments, the facility uses a variety of techniques to filter historical performance data used to determine how long it will take for a particular carrier to deliver a package from an origination point to a destination. For example, in some embodiments, the facility bases such determination only on historical performance data collected from shipments performed during a similar season, on a similar or the same day of the week, under similar weather/traffic/shipping demand conditions, etc. The facility can obtain performance data in a variety of ways, such as in regular, comprehensive data transfers provided explicitly by the carrier; by querying a web interface for delivery information provided by the carrier to senders and/or recipients; by requesting and/or providing an incentive to recipients to report the date and time at which packages sent by the merchant are received by recipients; etc. In particular, in some embodiments, the facility uses data that is exclusively compiled by a party other than the carrier whose performance is being measured.

The benefits provided by the facility may be realized even in embodiments in which the facility is for some orders unsuccessful at causing the packages of the order to arrive at the destination and/or the staging point for the destination at the same time. Indeed, any improvement in scheduling can provide similar benefits.

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data—including data structures, database tables, other data tables, etc.—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. In various embodiments, the facility can be accessed by any suitable user interface including Web services calls to suitable APIs. While computer systems configured as described above are typically used to support the operation of the facility, one of ordinary skill in the art will appreciate that the facility may be implemented using devices of various types and configurations, and having various components.

Figure 2:
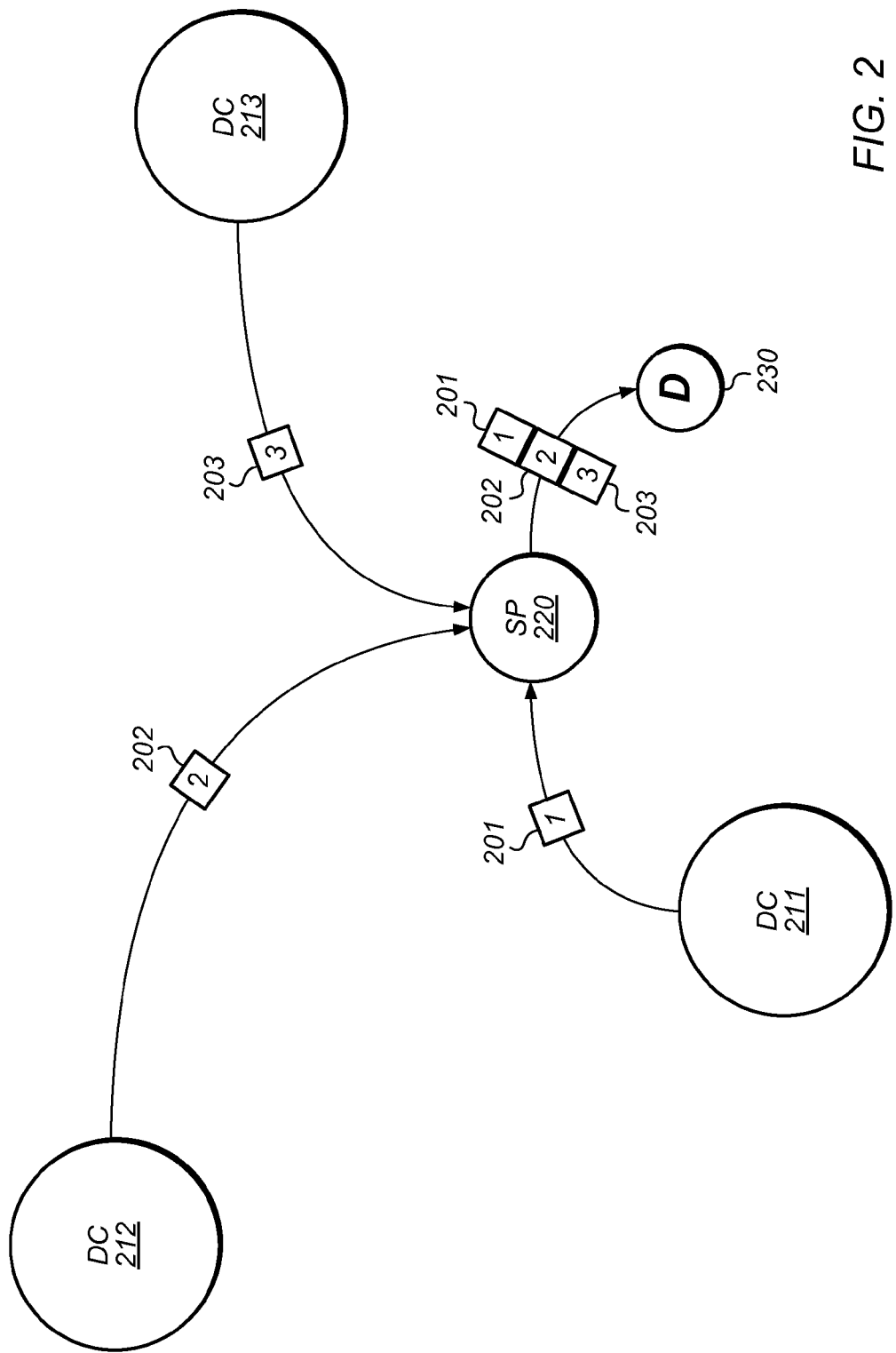
FIG. 2 is a transportation diagram showing the delivery of a typical order by the facility.

FIG. 2 is a transportation diagram showing the delivery of a typical order by the facility. The order is made up of three shipments 201-203. Each of these shipments includes one or more containers—such as boxes—each containing items or portions of items specified by the order. Each of the shipments originates at a different distribution center—for example, shipment 201 originates at distribution center 211—and all are addressed to the same destination 230. In various embodiments, the originating distribution centers are separate physical facilities all operated by the same legal entity, physical facilities each operated by a different legal entity, or combinations thereof. In some embodiments, the originating distribution centers can include other types of locations, such as homes. The facility generates a shipment release schedule specifying, for each of the shipments, a scheduled release time at which the corresponding distribution center is to release the shipment to the carrier. In particular, the facility selects scheduled release times in a way intended to cause all of the shipments to arrive at approximately the same time at a staging point 220 from which the carrier delivers containers to the destination. The facility can operate in connection with various types of staging points, including a carrier sort facility, a carrier delivery vehicle, the destination location, or a distribution center other than the distribution center from which the package originates, as examples. (In some embodiments, the facility selects scheduled release times in a way intended to cause all of the shipments to arrive at approximately the same time at the destination as a proxy for selecting scheduled release times in a way intended to cause all of the shipments to arrive at approximately the same time at the staging point.) To the extent that all of the shipments arrive at the staging point at approximately the same time, such as during the same delivery cycle used by the carrier, this coordinated release of the shipments in accordance with the facility enables the carrier to deliver all of the packages to the destination in the same visit to the destination. Because the number of visits to the destination by the carrier has been reduced—in this case from three to one—the overall delivery of the three shipments has a lower cost to the carrier than it would if each of the shipments was delivered to the destination in its own visit. Accordingly, in some cases, the carrier may charge the shipper—such as the merchant or a contractor for the merchant—a lower total shipping price than if the three shipments each require their own visit to the destination. In some embodiments, any number of carriers may participate in the delivery of the packages constituting the order, by performing portions or the entirety of any of the four delivery legs depicted in FIG. 2.

Figure 3:
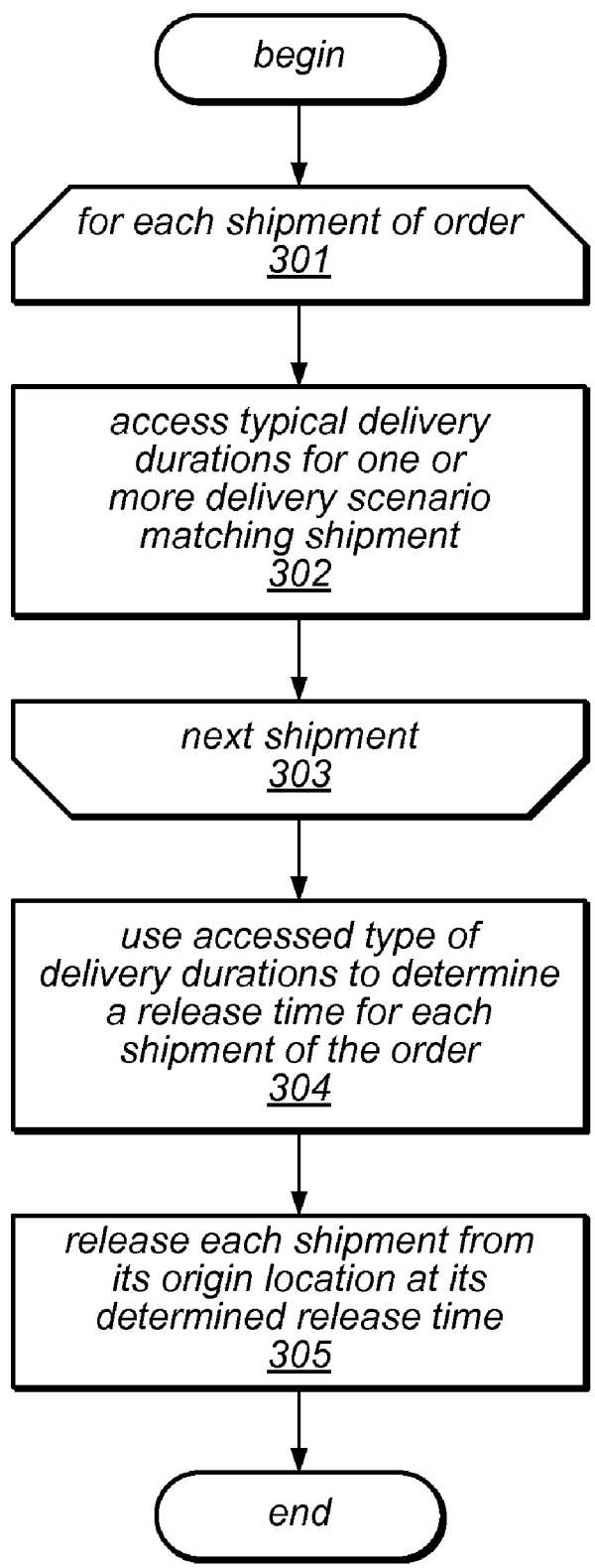
FIG. 3 is a flow diagram showing steps typically performed by the facility to schedule delivery of an order.

FIG. 3 is a flow diagram showing steps typically performed by the facility to schedule delivery of an order. In steps 301-303, the facility loops through each shipment of the order. In step 302, the facility accesses typical delivery durations for one or more delivery scenarios that match the shipment.

FIG. 4 is a table diagram showing sample contents of a shipping performance information table containing typical delivery durations for delivery scenarios. The table 400 is made up of rows, such as rows 401-407, each corresponding to a different delivery scenario. In the embodiments reflected in FIG. 4, each delivery scenario specifies at least four pieces of information: an origin location from which shipments are released, identified in column 411; a destination to which shipments are addressed, identified in column 412; a particular carrier capable of delivering packages from the origin location to the destination, identified in column 413; and a service class provided by the carrier that is available for shipments from the origin location to the destination, identified in column 414. For example, row 402 corresponds to a delivery scenario in which shipments are released at original location "1201 3d Ave Seattle Wash. 98101" for delivery to destination "131 S Dearborn St Chicago Ill. 60603" using the carrier "SHIP-RITE" using the "2d day" service class. Some delivery scenarios further specify one or more conditions that can be used by the facility to more closely tailor typical delivery times to the specific circumstances, or "conditions," under which a particular shipment is being delivered, identified in column 415. In various embodiments, such conditions can range widely; in some embodiments, such conditions can include conditions such as day of week, time of year, season, popular specific occasions, weather conditions, level of demand for shipping services, fuel prices, traffic level, traffic conditions, shipping industry labor conditions, labor conditions of the selected shipper, equipment supply of the selected shipper, equipment condition of the selected shipper, etc. In general, these conditions limit actual carrier performance data points considered by the facility in calculating a typical delivery duration for a delivery scenario. For example, row 402 specifies the condition "under 12 pounds" indicating that only data points about shipments from this origin to this destination using this carrier and service class having a weight less than 12 pounds should be considered in calculating a typical delivery duration or the delivery scenario to which row 402 corresponds. In column 416, each row indicates a typical delivery duration determined by the facility for the delivery scenario. For example, the delivery duration 3.33 shown at the intersection of column 416 and row 402 indicates that, among prior shipments having the original location, destination, carrier, and class specified in row 402 that were under 12 pounds had an average delivery duration of 3.33 days (here ignoring Sundays). In column 417, each row indicates the number of data points supporting the delivery duration indicated in column 416—that is, the number of data points aggregated to obtain the delivery duration. In some cases, the facility places greater reliance on delivery durations determined for delivery scenarios for which there is a greater volume of supporting detail. For example, in comparing row 404 to row 401, it can be seen that, for the same origin location, destination, carrier, and class, only one data point supports a typical delivery duration determined for packages released on Friday, while four data points support a typical delivery duration determined for all shipments having the specified origin location, destination, carrier, and class. In some embodiments (not shown), the shipping performance information table or a separate information resource further includes information identifying cutoff times for each combination of origin location and carrier that identify a time release after which can cause the delivery duration to increase by a day over the delivery duration for packages released before it. Where cutoff time information is available, the facility typically takes advantage of it in scheduling release times as described further below.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows; etc.

Returning to FIG. 3, in various embodiments, in step 302, the facility accesses typical delivery durations for all of the delivery scenarios for which typical delivery durations are available that match the current shipment; for the most specific matching delivery scenario having a typical delivery duration; or the matching delivery scenario having the highest volume of supporting detail. In step 303, if additional shipments in the order remain to be processed, then the facility continues in step 302 to process the next shipment, else the facility continues in step 304. In step 304, the facility uses the typical delivery durations accessed in step 302 for the shipments of the order to determine a release time for each shipment of the order. In some embodiments, the facility does so by identifying the shipment whose delivery scenario has the longest typical delivery duration, selecting the soonest available release time for this shipment, and, for each other shipment, adding the typical delivery duration for the shipment to the release time selected for the identified shipment. Additional detail about manners in which the facility performs step 304 in some embodiments are contained in U.S. patent application Ser. No. 10/664,600, filed on Sep. 19, 2003, and U.S. patent application Ser. No. 10/868,392, filed on Jun. 15, 2004, each of which is hereby incorporated by reference in its entirety. In step 305, the facility releases each shipment from its origin location at the release time determined for the shipment in step 304. After step 305, these steps conclude.

Those skilled in the art will appreciate that the steps shown in FIG. 3 and in each of the flow diagrams discussed below may be altered in a variety of ways. For example, the order of the steps may be rearranged; substeps may be performed in parallel; shown steps may be omitted, or other steps may be included; etc.

In some embodiments (not shown), the facility schedules delivery of an order by exercising control over the release time of all of the packages but one, hereafter referred to as the "uncontrolled package." This can be useful where the uncontrolled package must be released from a distribution center that either cannot or cannot accurately schedule the release of a package. In such embodiments, the facility instructs the release of the uncontrolled package, and monitors for an indication that the uncontrolled package has been released that identifies the actual release time of the uncontrolled package. Based upon this actual release time, the facility selects release times for the packages of the order other than the uncontrolled package in the manner described above in connection with FIG. 3. Where the items contained in the uncontrolled package are available from two or more distribution centers that are unable to exercise reliable control over the release schedule of packages, the facility typically selects one of these distribution centers having a delivery time to the destination that is longer than the delivery times for the other packages of the order, such as by selecting the distribution center having the longest delivery time to the destination. Doing so provides additional flexibility in the scheduling of the packages of the order other than the uncontrolled package.

Figure 5:
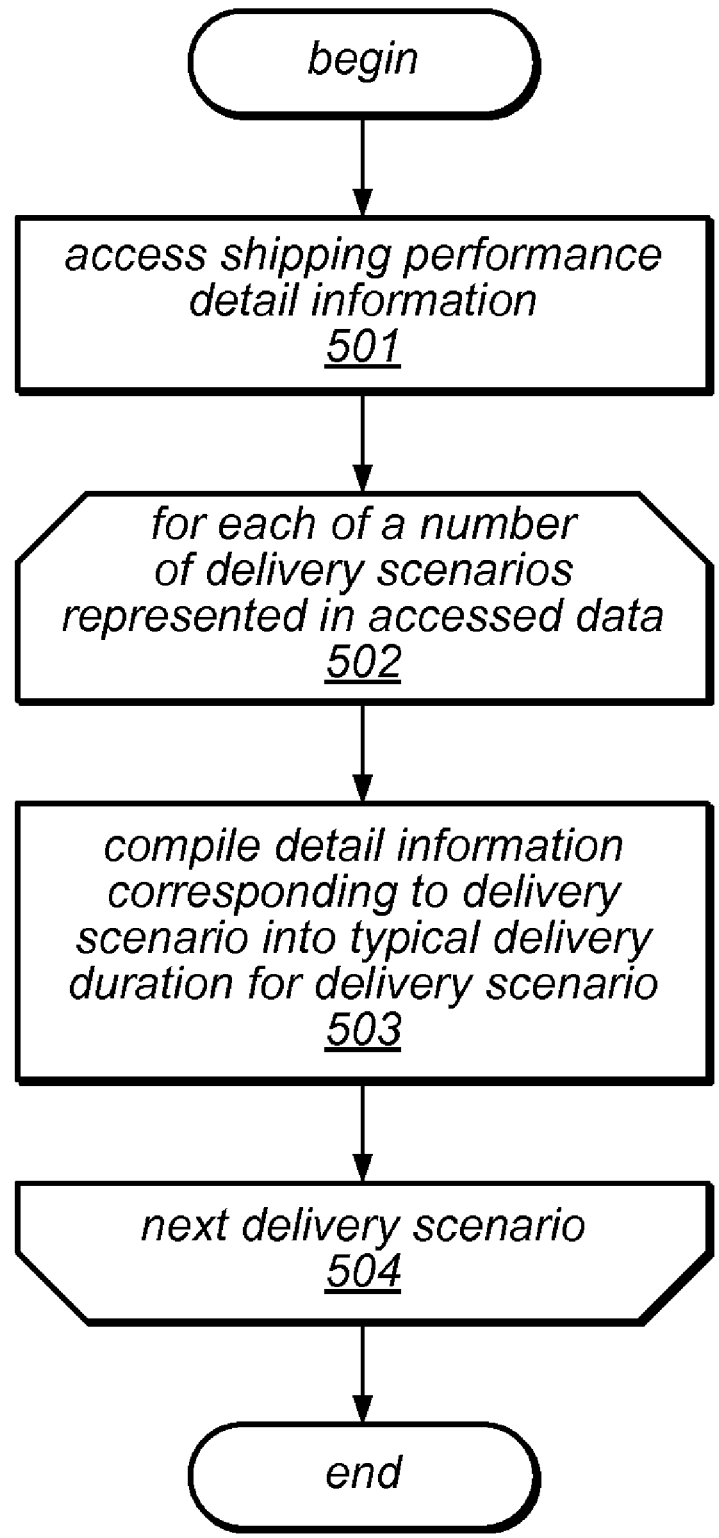
FIG. 5 is a flow diagram showing steps typically performed by the facility in order to determine typical delivery durations for delivery scenarios.

FIG. 5 is a flow diagram showing steps typically performed by the facility in order to determine typical delivery durations for delivery scenarios. In step 501, the facility accesses shipping performance detail information.

FIG. 6 is a table diagram showing sample shipping performance detail information stored in a shipping performance detail information table. The table 600 is comprised of rows, such as rows 601-607, each corresponding to the delivery of a particular shipment, and containing information about the shipment and its delivery. Each row contains data in the following columns: the origin location from which the shipment was released, identified in column 611; the destination to which the shipment was addressed, identified in column 612; the release time from which the shipment was released to the carrier, identified in column 613; the arrival time at which the shipment arrived at the destination, identified in column 614; a weight ascribed to the shipment, identified in column 615; the carrier used to delivery the shipment, identified in column 616; and the service class used to deliver the shipment, identified in column 617. For example, row 601 indicates that a shipment was released from the origin location "1201 3d Ave Seattle Wash. 98101" address to the destination "131 S Dearborn St Chicago Ill. 60603," released on Monday, May 2, 2005, at 4:15 p.m., arrived on May 4, 2005, at 9:43 a.m., weighing 4.5 pounds, delivered by the carrier "SHIPRITE" using its "2d day" service class. In various embodiments, the facility collects the data in table 400 in one or more ways, including asking the recipient of each order to report the arrival times of the shipments making up the order; using an interface provided by the carrier, such as a web page or web services interface, to request arrival time information from the carrier, etc.

Returning to FIG. 5, in steps 502-504, the facility loops through each of a number of delivery scenarios represented in the accessed shipping performance detail information. In step 503, the facility compiles detail information corresponding to the current delivery scenario into a typical delivery duration for a delivery scenario. In step 504, if additional delivery scenarios remain to be processed, then the facility continues in step 502 to process the next delivery scenario, else these steps conclude. It can be seen by comparing FIG. 6 to FIG. 4 that the facility identified each of the seven delivery scenarios shown in table 400 as being represented in table 600. The delivery scenario identified in row 401 of table 400 is represented in rows 601, 602, 603, and 607 of table 600. The value 4, at the intersection of row 401 with column 17, refers to the number of rows of table 600 representing the delivery scenario, while the value 3.25 at the intersection of row 401 with column 416 indicates that the average difference between release time and arrival time for these rows of FIG. 6 (in some embodiments adjusting for weekends, holidays, etc.). In some embodiments, the facility performs a variety of other kinds of aggregations on the individual delivery durations, such as selecting the median, filtering out aberrant data points, filtering out older data points, etc. Row 402 of table 400 corresponds to rows 601, 603, and 607 of FIG. 6. Row 403 of table 400 corresponds to rows 601, 602, and 603 of table 600. Row 404 of table 400 corresponds to row 603 of table 6. Row 405 of table 400 corresponds to rows 601 and 602 of table 6. Row 406 of table 4 corresponds to rows 601, 602, and 604 of table 6. It can be seen that row 406 generalizes the following two destinations, represented in different rows of table 400 "131 S Dearborn St Chicago Ill. 60603" and "2 Prudential Plaza Chicago Ill. 60601." Such generalization may be useful, for example, where few or no data points are available for a particular origin location address or destination address. Also, the facility may perform such generalization at a variety of different levels of geographic granularity, such as the same neighborhood, city, county, state, region, 5-digit zip code, 9-digit zip code, contact telephone number area code, contact telephone number area code and prefix, etc. Row 407 of table 4 corresponds to rows 605 and 606 of table 6.

As an example of how FIG. 4 may be used by the facility, where an order is made up of two shipments, both addressed to the destination "131 S Dearborn St Chicago Ill. 60603," the first from the origin location "1201 3d Ave Seattle Wash. 98101," the second from origin location "101 N Central Ave Phoenix Ariz. 85012," the facility may use row 405 to discern a typical delivery duration of 2.5 days for the first shipment, and may use row 407 to discern a typical delivery duration of four days for the second shipment. The facility would select the second shipment as having the longest typical delivery duration, select the soonest available release time for the second shipment, and schedule a release time for the first shipment that was 1.5 days earlier than the release time scheduled for shipment two. In a variety of embodiments, the facility uses a variety of approaches to dealing with fractional typical delivery durations, such as by directional rounding, rounding up, rounding down, etc. In some embodiments, rather than pre-generating table 400 from the contents of table 600, the facility directly analyzes the contents of table 600 when scheduling each order, selecting the rows that best match the delivery scenario corresponding to each shipment of the order.

It will be appreciated by those skilled in the art that the above-described facility may be straightforwardly adapted or extended in various ways. For example, the facility may be operated by a web merchant or other seller of items; a contractor charged by the seller with shipping the items; a contractor relied upon by the seller to recommend when the seller should release the shipments, and/or which carriers and classes of service to employ, etc. The facility may use a variety of scheduling algorithms. The facility may be used in connection with a wide variety of payment terms for a variety of parties, including the parties referred to immediately above, the customer, and/or the addressee. The facility may be used to schedule the release of any number of shipments making up an order, and any number of packages or other containers making up a shipment. In some embodiments, the facility coordinates shipments collectively containing only a proper subset of the items specified in an order. While the foregoing description makes reference to particular embodiments, the scope of the invention is defined solely by the claims that follow and the elements recited therein.

We claim:

1. A non-transitory computer-readable medium storing computer-executable contents for shipping items specified in a single customer order, the customer order further specifying a destination address, wherein when executed on a computer said contents cause the computer to perform:

identifying a plurality of distribution centers that collectively have adequate inventory in the items specified in the order to satisfy the order;

initiating packing, at each identified distribution center, a shipment containing a proper subset of the items of the order;

selecting a carrier to deliver the packed shipments;

accessing shipper performance information compiled by a party other than a selected carrier providing typical delivery durations for packages delivered by the selected carrier in each of a plurality of delivery scenarios, each delivery scenario specifying at least an origin location and a destination, the plurality of delivery scenarios for which typical delivery durations are provided including delivery scenarios all specifying the destination address specified for the order and each specifying an origin location corresponding to one of the identified distribution centers;

using the accessed shipper performance information to select a release time for each of the packed shipments, such that the selected release times are expected to cause the selected carrier to deliver all of the packed shipments to the destination address at a common delivery time; and releasing each of the packed shipments to the selected carrier in accordance with the release time selected for the packed shipment.

2. A method in a computing system, the method comprising:

performing, by one or more computers:

scheduling release of a pair of packages comprising items of a common order, a first package of the pair to be released from a first origin location of a first distribution center, a second package of the pair to be released from a second origin location of a second distribution center that is distinct from the first distribution center, both packages of the pair to be shipped to a common destination distinct from both the first distribution center and the second distribution center, wherein said scheduling comprises:

receiving information generated by a party other than a selected carrier, wherein the received information indicates delivery durations for packages previously delivered by the selected carrier in each of a plurality of delivery scenarios, wherein the received information corresponding to each delivery scenario specifies at least an origin location from which one or more packages were shipped and a destination to which the one or more packages were shipped, wherein the received information for a first delivery scenario specifies the first origin location and the common destination, wherein the received information for a second delivery scenario specifies the second origin location and the common destination;

based on the received information for the first and second delivery scenarios, selecting a release time for release of the first package from the first origin location of the first distribution center and a release time for release of the second package from the second origin location of the second distribution center such that the selection of the release times is expected to cause the selected carrier to deliver both packages of the pair to the common destination at a common delivery time; and constructing a release schedule specifying the release time selected for the first package and the release time selected for the second package.

3. The method of claim 2, further comprising causing the packages of the pair to be released from their respective distribution centers in accordance with the constructed release schedule.

4. The method of claim 3 wherein the packages are released from origin locations corresponding to different physical facilities operated by the same entity.

5. The method of claim 3 wherein the packages are released from origin locations corresponding to physical facilities each operated by a different entity.

6. The method of claim 2 wherein the common destination is a staging point for delivery to an ultimate destination, the method further comprising:

initiating transport of the released first package from the first origin location to the staging point; and initiating transport of the released second package from the second origin location to the staging point.

7. The method of claim 2 wherein the common destination is a staging point for delivery to an ultimate destination, the method further comprising initiating the transport of the first and second packages from the staging point to the ultimate destination.

8. The method of claim 2 wherein the received information is compiled from data reflecting actual delivery durations for packages delivered by the selected carrier in delivery scenarios among the plurality of delivery scenarios.

9. The method of claim 8 wherein data reflecting actual delivery durations for packages delivered by the selected carrier from which the received information is compiled is obtained from the selected carrier.

10. The method of claim 8 wherein data reflecting actual delivery durations for packages delivered by the selected carrier from which the received information is compiled is obtained from an arrival time reported by recipients of packages.

11. The method of claim 2, further comprising constructing the received information.

12. The method of claim 2 wherein the received information is received from a third party.

13. The method of claim 2 wherein the received information further includes a delivery duration for a third delivery scenario specifying a third origin location of a third package and the common destination; and wherein the selecting comprises selecting release times for the first, second, and third packages such that the selection is expected to cause the carrier to deliver the first, second, and third packages to the common destination at a common delivery time; and wherein the constructed release schedule specifies the first release time for the first package, the second release time for the second package, and the release time selected for the third package for the third package.

14. The method of claim 2 wherein said selecting comprises selecting release times expected to cause the carrier to deliver both packages of the pair to the common destination on the same day.

15. The method of claim 2 wherein said selecting comprises selecting release times expected to cause the carrier to deliver both packages of the pair to the common destination during a common delivery cycle of the carrier.

16. The method of claim 2 wherein said selecting comprises selecting release times expected to cause the carrier to deliver both packages of the pair to an address of a common addressee of the package at a common delivery time.

17. The method of claim 2 wherein said selecting comprises selecting release times expected to cause the carrier to deliver both packages of the pair to a common staging point from which the carrier delivers packages to an address of a common addressee of the packages at a common delivery time.

18. The method of claim 2, further comprising receiving financial consideration for reducing the number of visits to an address of a common addressee of the packages.

19. The method of claim 2 wherein the selecting comprises:
identifying the package of the pair whose delivery scenario has the longest typical delivery duration;
selecting the soonest available release time for the identified package of the pair;
adding the delivery duration for the identified package's delivery scenario to the release time selected for the identified package to obtain an expected delivery time;
subtracting the delivery duration for the delivery scenario of the package of the pair not identified from the expected delivery time to obtain and select a release time for the package of the pair not identified.

20. The method of claim 2 wherein the delivery scenarios for which delivery durations are provided by the received information further specify indicators of delivery conditions of at least one delivery condition type, and wherein the method comprises utilizing the received information to select release times for the packages of the pair expected to cause the carrier to deliver both packages of the pair to the common destination at a common delivery time based on the delivery conditions expected to exist for the packages of the pair.

21. The method of claim 20 wherein the delivery condition types are selected from among: day of the week; time of year; season; popular special occasions; weather conditions; level of demand for shipping services; fuel prices; traffic level; traffic conditions; shipping industry labor conditions; labor conditions of the selected shipper; equipment supply of the selected shipper; and equipment condition of the selected shipper.

22. A computer-readable medium whose contents direct a computing system to:
schedule release of a pair of packages comprising items of a common order, a first package of the pair to be released from a first origin location of a first distribution center, a second package of the pair to be released from a second origin location of a second distribution center that is distinct from the first distribution center, both packages of the pair to be shipped to a common destination distinct from both the first distribution center and the second distribution center, wherein to schedule the release of the pair of packages, the contents are configured to direct the computing system to:
for each of one or more carriers: receiving information generated by a party other than that carrier, wherein the received information indicates delivery durations for packages delivered by the carrier in each of a plurality of delivery scenarios, wherein the information corresponding to each delivery scenario specifies at least an origin location from which one or more packages were shipped and a destination to which the one or more packages were shipped, wherein the received information for a first delivery scenario specifies the first origin location and the common destination, wherein the received information for a second delivery scenario specifies the second origin location and the common destination;
based on the received information, selecting for the first package a carrier and a release time for release of the first package from the first origin location, wherein said selecting is additionally based upon a carrier and a release time from the second origin location selected for the second package, wherein said selecting is expected to cause both packages of the pair to be delivered to the common destination at a common delivery time; and
constructing a release schedule specifying the release time selected for the first package.

23. The computer-readable medium of claim 22, wherein the contents are configured to direct the computing system to select for the second package a carrier and a release time from the second origin location based upon the received information.

24. The computer-readable medium of claim 22 wherein, when the carrier and release time are selected for the first package, a carrier and a release time for the second package has already been selected.

25. The computer-readable medium of claim 22 wherein, when the carrier and release time are selected for the first package, the second package has already been released to the carrier selected for the second package from the second origin location.

26. The computer-readable medium of claim 22 wherein the carrier selected for the first package is the same as the carrier selected for the second package.

27. The computer-readable medium of claim 22 wherein the carrier selected for the first package is different from the carrier selected for the second package.

28. One or more computer memories collectively storing:
a carrier performance data structure for a selected carrier generated by a party other than the selected carrier, the data structure comprising a plurality of entries for packages comprising items of a common order, each entry comprising:
information identifying an origin location;
information identifying a destination location; and
information indicating a delivery duration for one or more of said packages delivered by the selected carrier from the identified origin location to the identified destination, such that the contents of the data structure are configured to be utilized by a computer system to determine, for a plurality of shipments of said packages sharing a common destination and each having a different origin location at different distribution centers, a release time for each shipment that are collectively expected to cause all of the packages of the plurality to arrive at the common destination at the same time, wherein the common destination is distinct from each of said distribution centers.

29. The computer memories of claim 28 wherein the delivery durations are generated from data indicating actual delivery durations for packages delivered by the selected carrier in delivery scenarios among the plurality of delivery scenarios.

30. The computer memories of claim 28 wherein each entry further comprises information specifying an indicator of a delivery condition, and wherein the information indicating a delivery duration contained by each entry indicates a delivery duration for packages delivered by the selected carrier under the indicated delivery condition.

31. The computer memories of claim 28 wherein the data structure comprises entries for a plurality of carriers including the selected carrier.

32. One or more computer memories collectively storing a release schedule data structure for an order having a single addressee address, the data structure containing information specifying, for each of a plurality of shipments making up the order, each of the shipments having a different origin location at a different distribution center of a plurality of distribution centers, a release time at which the shipment is to be released from its origin location, the indicated release times being selected on the basis of carrier delivery durations from each of the origin locations to the addressee address to cause all of the shipments of the order to be delivered to the addressee address at the same time, such that the contents of the release schedule data structure are configured to be utilized by a computer system to schedule the release of the shipments of the order according to the selected release times.

33. A method, comprising:
performing, by one or more computers:
controlling transport of a plurality of packages all addressed to a distinguished destination, wherein said plurality of packages are packages of a common order, wherein said controlling comprises:
for each given distribution center of a plurality of different distribution centers located in distinct locations:
providing a subset of the plurality of packages each at an origin location of the package at the given distribution center; and
initiating the transport of each package of the subset to arrive at a staging point for the distinguished destination at the same time, such that the plurality of packages are configured to be transported together from the staging point to the distinguished destination.

34. A method, comprising:
performing, by one or more computers:
controlling transport of a plurality of packages all addressed to a distinguished destination, wherein said plurality of packages are packages of a common order, wherein said controlling comprises:
initiating, via multiple different distribution centers in distinct locations, the transport of different packages of the plurality of packages at multiple different release times according to a release schedule that is based on past delivery duration information for a plurality of carriers;
receiving from said multiple different distribution centers all of the packages of the plurality of packages at a single staging point for the distinguished destination at the same time, packages of the plurality having been transported to the staging point by a plurality of carriers; and
initiating the transport of the plurality of packages together from the staging point to the distinguished destination.

35. A method in a computing system, comprising:
performing, by one or more computers:
scheduling release of a pair of packages comprising items of a common order, a first package of the pair to be released from a first origin location of a first distribution center, a second package of the pair to be released from a second origin location of a second distribution center that is distinct from the first distribution center, both packages of the pair bound for a common destination, wherein said scheduling comprises:
for each of a plurality of carriers, accessing information providing delivery durations for packages previously delivered by the carrier in each of a plurality of delivery scenarios, wherein the accessed information corresponding to each delivery scenario specifies at least an origin location from which one or more packages were shipped and a destination to which the one or more packages were shipped, wherein the received information for a first delivery scenario specifies the first origin location and the common destination, wherein the received information for a second delivery scenario specifies the second origin location and the common destination;
based on the accessed information, selecting for the first package a carrier and a release time from the first original location and for the second package a carrier other than the carrier selected for the first package and a release time from the second origin location that are collectively expected to cause both packages of the pair to be delivered to the common destination at a common delivery time; and
constructing a release schedule specifying the carrier and release time selected for the first package and the carrier and release time selected for the second package.

* * * * *